(12) United States Patent
Yamakage et al.

(10) Patent No.: US 11,646,624 B2
(45) Date of Patent: May 9, 2023

(54) ELECTRIC COMPRESSOR

(71) Applicant: KABUSHIKI KAISHA TOYOTA JIDOSHOKKI, Kariya (JP)

(72) Inventors: Shumpei Yamakage, Aichi-ken (JP); Yusuke Kinoshita, Aichi-ken (JP); Junya Yano, Aichi-ken (JP)

(73) Assignee: KABUSHIKI KAISHA TOYOTA JIDOSHOKKI, Toyota (JP)

( * ) Notice: Subject to any disclaimer, the term of this patent is extended or adjusted under 35 U.S.C. 154(b) by 149 days.

(21) Appl. No.: 16/824,192

(22) Filed: Mar. 19, 2020

(65) Prior Publication Data
US 2020/0313495 A1 Oct. 1, 2020

(30) Foreign Application Priority Data

Mar. 28, 2019 (JP) .............................. JP2019-063153
Dec. 18, 2019 (JP) .............................. JP2019-227824

(51) Int. Cl.
*H02K 5/10* (2006.01)
*H02K 3/50* (2006.01)
(Continued)

(52) U.S. Cl.
CPC ................. *H02K 5/10* (2013.01); *H02K 3/50* (2013.01); *H02K 7/14* (2013.01); *H02K 11/33* (2016.01); *F25B 31/02* (2013.01); *H02K 2203/06* (2013.01)

(58) Field of Classification Search
CPC . H02K 5/10; H02K 3/50; H02K 11/33; H02K 7/14; H02K 2203/06; H02K 5/00;
(Continued)

(56) References Cited

U.S. PATENT DOCUMENTS 9,017,045 B2   4/2015   Kinoshita et al.
9,599,109 B2   3/2017   Yakushiji
(Continued)

FOREIGN PATENT DOCUMENTS

CN   106286834 A   1/2017
CN   107366624 A   11/2017
(Continued)

OTHER PUBLICATIONS

Communication dated Sep. 17, 2021, issued by the State Intellectual Property Office of the P.R.C. in application No. 202010229406.2.

*Primary Examiner* — Alexander A Singh
(74) *Attorney, Agent, or Firm* — Sughrue Mion, PLLC

(57) ABSTRACT

An electric compressor includes a cylindrical motor housing, an inverter case, and a conductive member. The inverter case is joined to an end portion of the motor housing. The inverter case includes a cylindrical case peripheral wall surrounding the end portion. The end portion has an end face that extends in a radial direction of the motor housing and a peripheral surface that extends in an axial direction of the motor housing and is connected to the end face. A ring-shaped sealing member is disposed between the peripheral surface and the case peripheral wall. An accommodation groove for accommodating the sealing member is recessed in the peripheral surface. The sealing member is held by the peripheral surface and the case peripheral wall in a radial direction of the sealing member to seal a space in which the conductive member is disposed.

7 Claims, 4 Drawing Sheets

(51) Int. Cl.
*H02K 11/33* (2016.01)
*H02K 7/14* (2006.01)
*F25B 31/02* (2006.01)

(58) Field of Classification Search
CPC .. H02K 5/02; H02K 5/04; H02K 5/06; H02K 5/08; H02K 5/15; H02K 11/00; H02K 11/30; H02K 11/38; F04C 27/008; F04C 23/008; F04C 18/0215; F04C 2240/808; F25B 31/02; F25B 2600/021; F25B 2400/077; Y02B 30/70
USPC ......................................................... 310/89
See application file for complete search history.

(56) References Cited

U.S. PATENT DOCUMENTS

| | | | |
|---|---|---|---|
| 2009/0060768 A1 | 3/2009 | Takei | |
| 2009/0185930 A1 | 7/2009 | Duppert et al. | |
| 2012/0237376 A1* | 9/2012 | Kinoshita | F04B 39/121 417/423.7 |
| 2016/0065027 A1* | 3/2016 | Taniguchi | H02K 5/15 310/88 |
| 2016/0094104 A1* | 3/2016 | Yamasaki | H02K 11/33 310/68 D |
| 2016/0218583 A1* | 7/2016 | Hayashi | H02K 5/10 |
| 2017/0274728 A1* | 9/2017 | Suzuki | F04C 18/126 |
| 2017/0276136 A1* | 9/2017 | Kinoshita | F04C 29/0085 |
| 2019/0207488 A1* | 7/2019 | Ichikawa | H02K 11/33 |
| 2019/0345956 A1* | 11/2019 | Iizuka | F04D 25/06 |

FOREIGN PATENT DOCUMENTS

| | | | |
|---|---|---|---|
| EP | 1876356 A1 | 1/2008 | |
| EP | 2710264 A1 | 3/2014 | |
| EP | 2710265 A1 | 3/2014 | |
| EP | 3026303 A1 | 6/2016 | |
| JP | 2013-60816 A | 4/2013 | |
| JP | 2013-62899 A | 4/2013 | |
| JP | 5382036 B2 | 1/2014 | |
| JP | 2015-201490 A | 11/2015 | |
| JP | 2017-180137 A | 10/2017 | |
| KR | 10-2003-0008027 A | 1/2003 | |
| KR | 10-2018-0120129 A | 11/2018 | |
| WO | WO-2018047342 A1 * | 3/2018 | ............... H02K 9/22 |

* cited by examiner

ELECTRIC COMPRESSOR

CROSS REFERENCE TO RELATED APPLICATION

This application claims priority to Japanese Patent Application No. 2019-063153 filed on Mar. 28, 2019 and Japanese Patent Application No. 2019-227824 filed on Dec. 18, 2019, the entire disclosure of which is incorporated herein by reference.

The present disclosure relates to an electric compressor.

BACKGROUND ART

Korean Unexamined Patent Publication No. 10-2018-0120129 mentions a known electric compressor. This electric compressor includes a compression part, a motor, an inverter, a motor housing, an inverter case, and a rotary shaft.

The compression part is configured to compress refrigerant that serves as fluid. The motor is configured to drive the compression part. The inverter is configured to control the motor. The motor housing has a bottomed-cylindrical shape and accommodates the motor. The inverter case accommodates the inverter, and is joined to an end portion of the motor housing.

The motor housing includes a first housing fastened to the compression part and a second housing fastened to the first housing and the inverter case. The second housing includes a motor peripheral wall and a motor bottom wall. The motor peripheral wall has a cylindrical shape, extends in an axial direction of the rotary shaft, and cooperates with the first housing to accommodate the motor. The motor bottom wall is disposed at an end of the motor peripheral wall in the axial direction. The motor bottom wall has a circular disk shape, extends inwardly from the motor peripheral wall in a radial direction, and faces the inverter case in the axial direction. The motor bottom wall has an opening through which a plurality of lead terminals serving as a conductive member is inserted to connect the motor and the inverter.

The inverter case includes an inverter box that contacts an end of the second housing and an inverter cover that is fastened to the inverter box. The inverter box includes a box peripheral wall and an inverter bottom wall. The box peripheral wall has a cylindrical shape, extends in the axial direction, and surrounds the inverter. The inverter bottom wall extends inwardly from the box peripheral wall in a radial direction of the box peripheral wall on the motor housing side. The inverter bottom wall faces the motor bottom wall and contacts the motor bottom wall and the motor peripheral wall. The inverter cover includes a cover peripheral wall and an inverter cover wall. The cover peripheral wall has a cylindrical shape and contacts the box peripheral wall. The inverter cover wall has a circular disk shape and extends in the radial direction, and the inverter cover wall is connected to the cover peripheral wall and faces the inverter.

In this electric compressor, power is supplied from outside the compressor to the inverter in the inverter case, and then supplied to the motor via the lead terminals to activate the motor. This activates the compression part, so that an air conditioning device for a vehicle and the like operates.

However, the above-described known electric compressor does not include a sealing member for sealing a gap between the motor housing and the inverter case. Accordingly, in this electric compressor, moisture may enter from outside the compressor and contact the lead terminals, and therefore may cause deterioration of lead terminals and/or phase short circuit.

In order to prevent this possible problem, a sealing member may be disposed between a circular-ring-shaped first end face, which is formed in the motor peripheral wall or the motor bottom wall and extends in a direction perpendicular to the axial direction, and a circular-ring-shaped second end face, which is formed in the box peripheral wall or the inverter bottom wall of the inverter case and extends in the direction perpendicular to the axial direction.

This electric compressor, however, still has such a concern in a state where the electric compressor is in use in a moisture and salty environment. Particularly, when the motor housing and the inverter case are fastened to each other with a plurality of fasteners in the axial direction with too much fastening power of the fasteners in order to seek a sealing effect, the sealing member may be pressed excessively in the axial direction. This may decrease the durability of the sealing member.

As a solution to this concern, for example, the sealing member may be held between the motor housing and the inverter case in a radial direction of the motor housing. However, this configuration may cause the sealing member to move in the axial direction of the motor housing, i.e., a direction in which the inverter case is fastened to the motor housing, during the assembly of the inverter case and the motor housing, and may cause the sealing member to be deformed by the movement. This may therefore cause a decrease in the durability or the sealing effect.

The present disclosure, which has been made in light of such circumstances, is directed to providing an electric compressor that, even under severe conditions, has high durability and surely reduces a phase short circuit and deterioration of a conductive member through which an inverter and a motor are electrically connected.

SUMMARY

In accordance with an aspect of the present disclosure, there is provided an electric compressor that includes a compression part, a motor, an inverter, a motor housing, an inverter case, a fastener, and a conductive member. The compression part is configured to compress fluid. The motor is configured to drive the compression part. The inverter is configured to control the motor.

The motor housing has a bottomed-cylindrical shape and accommodates the motor. The inverter case is joined to an end portion of the motor housing and accommodates the inverter. The fastener fastens the inverter case to the motor housing in an axial direction of the motor housing. The inverter is electrically connected to the motor through the conductive member. The inverter case includes a case peripheral wall that has a cylindrical shape and surrounds the inverter and the end portion of the motor housing. The end portion of the motor housing has an end face that extends in a radial direction of the motor housing and a peripheral surface that extends in the axial direction of the motor housing and is connected to the end face, and the conductive member is disposed on the end face. A sealing member has a ring shape and is disposed between the peripheral surface and the case peripheral wall. An accommodation groove for accommodating the sealing member is recessed in the peripheral surface. The sealing member is held by the peripheral surface and the case peripheral wall in a radial direction of the sealing member to seal a space in which the conductive member is disposed.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which.

DETAILED DESCRIPTION OF THE EMBODIMENTS

The following will describe an electric compressor according to a first and a second embodiment of the present disclosure with reference to the drawings.

First Embodiment

Figure 1:
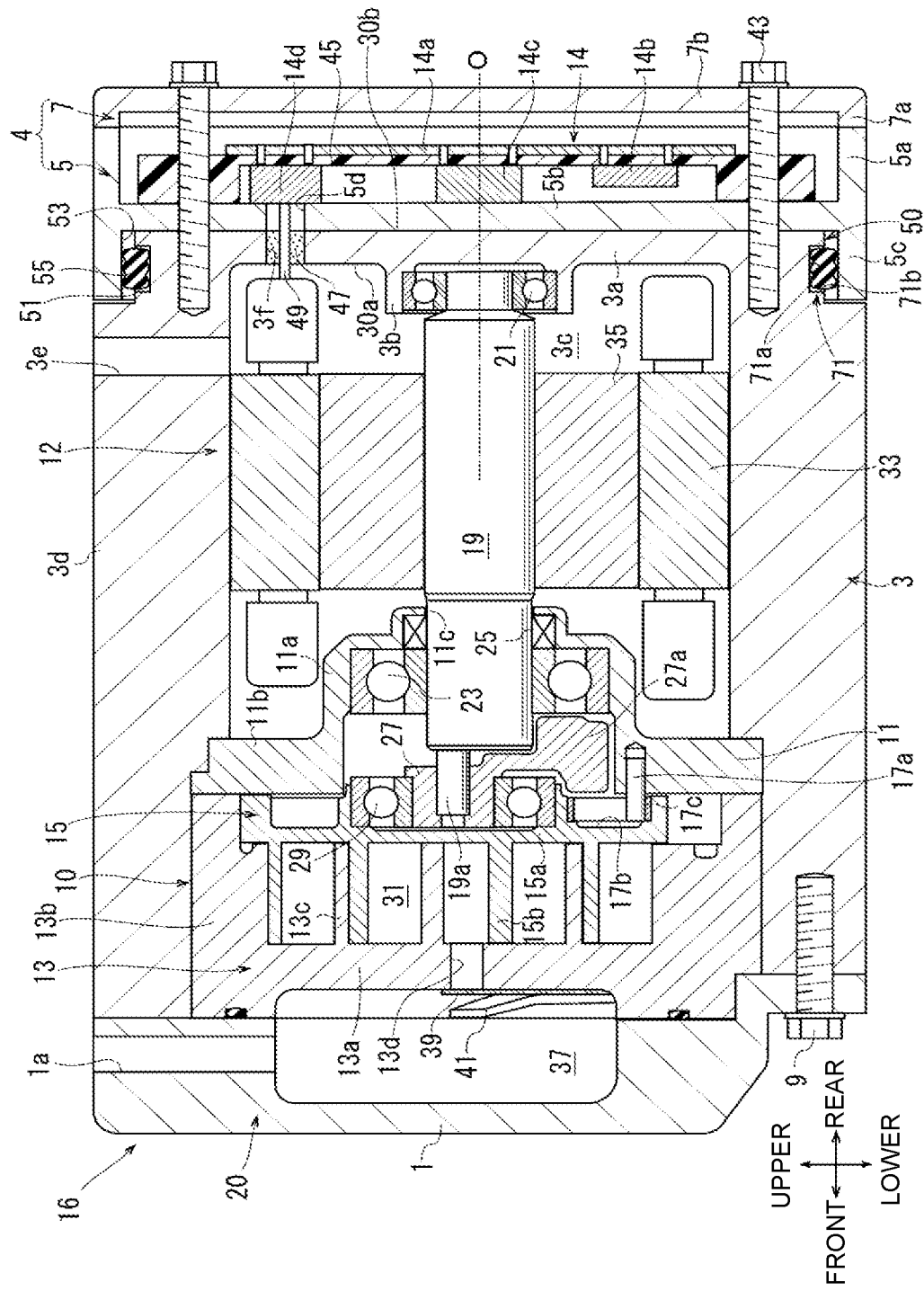
FIG. 1 is a longitudinal-sectional view of an electric compressor according to a first embodiment.

As illustrated in FIG. 1, an electric compressor according to the first embodiment includes a scroll-type compression part 10, a motor 12, an inverter 14, and a housing 16. The housing 16 includes a front housing 1, a motor housing 3, an inverter case 4, and a rotary shaft 19.

In the following description, the left side of FIG. 1 on which the front housing 1 is located corresponds to a front side of the electric compressor, and the right side of FIG. 1 on which the inverter case 4 is located corresponds to a rear side of the electric compressor. The upper side and the lower side of FIG. 1 correspond to an upper side and a lower side of the electric compressor, respectively. The front-to-rear direction of the compressor indicated in FIG. 1 corresponds to an axial direction of the rotary shaft 19 of the embodiment of the present disclosure, and the up-to-down direction of the compressor corresponds to a radial direction of the rotary shaft 19 of the embodiment of the present disclosure. Directions indicated in FIG. 2 and thereafter correspond to the directions indicated in FIG. 1. The front-to-rear direction of the embodiments is merely exemplary. The electric compressor of the present disclosure may be mounted in various postures depending on the vehicle on which the compressor is mounted, so that the front-to-rear direction of the electric compressor may be changed according to the posture. Further, the axial direction and the radial direction of the rotary shaft 19 correspond to those of the motor housing 3, the inverter case 4, and a sealing member 55 that will be described later.

As illustrated in FIG. 1, the front housing 1 and the motor housing 3 are in abutment with each other and fastened to each other with a plurality of bolts 9. The motor housing 3 includes a motor peripheral wall 3d that has a cylindrical shape and extends in the front-to-rear direction, and a motor bottom wall 3a that has a disk shape and is disposed at a rear end of the motor peripheral wall 3d, so that the motor housing 3 has a bottomed-cylindrical shape and has an opening on the front housing 1 side. A shaft supporting member 11 and a fixed scroll 13 are disposed within the motor housing 3, and the fixed scroll 13 is located in front of the shaft supporting member 11. The front housing 1 and the motor housing 3 cooperate to accommodate the fixed scroll 13 and the shaft supporting member 11 that are in contact with each other.

The motor bottom wall 3a has a front surface 30a facing frontward and a rear surface 30b facing rearward. The rear surface 30b serves as an end face of the present disclosure. The rear surface 30b, i.e., the motor bottom wall 3a, is located at a rear end of the motor housing 3. A shaft supporting portion 3b having a cylindrical shape projects forward from a center of the front surface 30a. The shaft supporting member 11 includes a main body 11a that has a cylindrical shape and a flange 11b that extends outward from an opening edge of a front end of the main body 11a. The main body 11a has a shaft hole 11c that is formed through a center of the main body 11a. The flange 11b is fixed to an inner peripheral surface of the motor housing 3. An anti-rotation pin 17a projects forward from a front surface of the flange 11b to restrain rotation of a movable scroll 15, which will be described later, while allowing orbiting of the movable scroll 15.

The rotary shaft 19 extends in the front-to-rear direction, and is inserted through the shaft hole 11c. The rotary shaft 19 is supported at its opposite ends by the shaft supporting member 11 and the shaft supporting portion 3b respectively via a radial bearing 23 and a radial bearing 21. A sealing member 25 is disposed behind the radial bearing 23, and seals a gap between the shaft supporting member 11 and the rotary shaft 19.

An eccentric pin 19a that has a columnar shape is disposed at a front end of the rotary shaft 19 at a position eccentrically displaced from an axis O of the rotary shaft 19, and the eccentric pin 19a extends in an axial direction of the rotary shaft 19. The eccentric pin 19a is fitted into and supported by a bushing 27. The bushing 27 is formed integrally with a balancing weight 27a that is formed over an approximately half circumference of an outer peripheral surface of the bushing 27 and spreads out in a fan-like shape outwardly from the outer peripheral surface of the bushing 27.

The fixed scroll 13 includes a fixed base plate 13a, a shell 13b, and a fixed scroll wall 13c. The fixed base plate 13a has a disk shape and extends in the radial direction. The shell 13b has a cylindrical shape and extends rearward from an outer peripheral region of the fixed base plate 13a. The fixed scroll wall 13c is disposed inward of the shell 13b and extends rearward in a scroll form from the fixed base plate 13a.

The movable scroll 15 is disposed between the bushing 27 and the fixed scroll 13 via a radial bearing 29. The movable scroll 15 includes a movable base plate 15a that has a disk shape and extends in the radial direction, and a movable scroll wall 15b that extends forward from the movable base plate 15a in a scroll form. The movable scroll wall 15b is engaged with the fixed scroll wall 13c.

The movable base plate 15 has an anti-rotation hole 17b that is formed in a rear surface of the movable base plate 15a and in which a top end of the anti-rotation pin 17a is loosely fitted. A ring 17c that has a cylindrical shape is loosely fitted in the anti-rotation hole 17b. The anti-rotation pin 17a slides and rotates on an inner peripheral surface of the ring 17c, thereby preventing the movable scroll 15 from rotating while allowing the movable scroll 15 to orbit around the axis O. The fixed base plate 13a, the fixed scroll wall 13c, the movable base plate 15a, and the movable scroll wall 15b cooperate to define a compression chamber 31.

Within the motor housing 3, a motor chamber 3c is formed behind the shaft supporting member 11. The motor chamber 3c doubles as a suction chamber. A stator 33 is disposed in the motor chamber 3c and fixed to an inner peripheral surface of the motor peripheral wall 3d. A rotor 35 is disposed in the stator 33 and fixed to the rotary shaft 19. The rotor 35 and the rotary shaft 19 are rotated together by energization of the stator 33 to generate the driving force that is transmitted to the movable scroll 15 via the eccentric pin 19a and the bushing 27 to cause the movable scroll 15 to orbit.

The motor chamber 3c communicates with the outside of the compressor through an inlet 3e formed through the motor peripheral wall 3d. The inlet 3e is connected to an evaporator (not illustrated) via piping. The evaporator is connected to an expansion valve and a condenser via piping. Refrigerant at low-pressure and low-temperature is introduced from the evaporator into the motor chamber 3c through the inlet 3e, and supplied to the compression chamber 31 through a suction passage (not illustrated) formed in the shaft supporting member 11.

A discharge chamber 37 is formed between the fixed base plate 13a and the front housing 1. The discharge chamber 37 communicates with the compression chamber 31 through a discharge port 13d that is formed through a center of the fixed base plate 13a. The discharge port 13d is opened and closed, in the discharge chamber 37, by a discharge valve 39 that is disposed on the fixed base plate 13a. The opening degree of the discharge valve 39 is regulated by a retainer 41 that is disposed on the fixed base plate 13a.

The discharge chamber 37 communicates with the outside of the compressor through an outlet 1a that is formed through the front housing 1. The outlet 1a is connected to the condenser (not illustrated) via piping. Refrigerant introduced into the discharge chamber 37 is discharged to the condenser through the outlet 1a.

The compression part 10 configured to compress refrigerant includes the motor chamber 3c, the rotary shaft 19, the bushing 27, the radial bearing 29, the movable scroll 15, the fixed scroll 13, the discharge chamber 37, the discharge valve 39, and the retainer 41. The compression part 10 may include an oil separator (not illustrated) that may be disposed in the discharge chamber 37. The motor 12 configured to drive the compression part 10 includes the rotor 35, the stator 33, and the rotary shaft 19. The front housing 1, the motor housing 3, the compression part 10, the motor 12, and the bolt 9 cooperate to form a compressor body 20.

The inverter case 4 includes an inverter box 5 and an inverter cover 7. The inverter box 5 of the inverter case 4 includes a first peripheral wall 5a, an inverter bottom wall 5b, and a second peripheral wall 5c. The first peripheral wall 5a has a cylindrical shape, and extends rearward in a direction of the axis O. The inverter bottom wall 5b has a disk shape, extends inwardly from the first peripheral wall 5a in the radial direction of the motor housing 3, and is connected to the first peripheral wall 5a on the motor peripheral wall 3d side. The inverter bottom wall 5b faces the rear surface 30b of the motor bottom wall 3a in an axial direction of the motor housing 3 and is in contact with the rear surface 30b. The second peripheral wall 5c has a cylindrical shape, and extends forward from the inverter bottom wall 5b in the axial direction, in other words, the second peripheral wall 5c is located opposite to the first peripheral wall 5a in the axial direction of the motor housing 3 with the inverter bottom wall 5b disposed between the first peripheral wall 5a and the second peripheral wall 5c. The first peripheral wall 5a is integrated with the inverter bottom wall 5b and the second peripheral wall 5c.

The inverter cover 7 includes a cover peripheral wall 7a and an inverter cover wall 7b. The cover peripheral wall 7a has a cylindrical shape, and has a diameter that is equal to a diameter of the first peripheral wall 5a and is coaxial with the first peripheral wall 5a. The cover peripheral wall 7a is disposed in contact with the first peripheral wall 5a via a gasket (not illustrated). The first peripheral wall 5a, the second peripheral wall 5c, and the cover peripheral wall 7a cooperate to serve as a case peripheral wall of the present disclosure. The inverter cover wall 7b has a disk shape, is connected to the cover peripheral wall 7a, and extends inwardly from the cover peripheral wall 7a in the radial direction. The cover peripheral wall 7a faces the inverter 14, specifically, a board 14a of the inverter 14 in the front-to-rear direction.

The inverter 14 is formed integrally with the inverter holder 45 that is made of a resin material. The inverter 14 includes the board 14a, a switching element 14b, a coil 14c, and a connector 14d. The board 14a is disposed on a surface of the inverter holder 45 on the inverter cover 7 side. The switching element 14b, the coil 14c, and the connector 14d are disposed on the other surface of the inverter holder 45 on the motor housing 3 side. The inverter 14 is connected to an external power source through an opening (not illustrated) formed in the inverter box 5 and the inverter cover 7. The inverter holder 45 is held in the first peripheral wall 5a within the inverter box 5.

The rear surface 30b of the motor bottom wall 3a extends in the radial direction of the motor housing 3 and has an opening 3f that communicates with the motor chamber 3c, and the inverter bottom wall 5b has an opening 5d that communicates with the opening 3f. Three lead terminals 49 each serving as a conductive member of the present disclosure is inserted through the opening 3f and the opening 5d via an insulator 47. In other words, the lead terminals 49 are disposed on the rear surface 30b. Coils of the stator 33 of the motor 12 are electrically connected to the connector 14d of the inverter 14 through the lead terminals 49.

Figure 2:
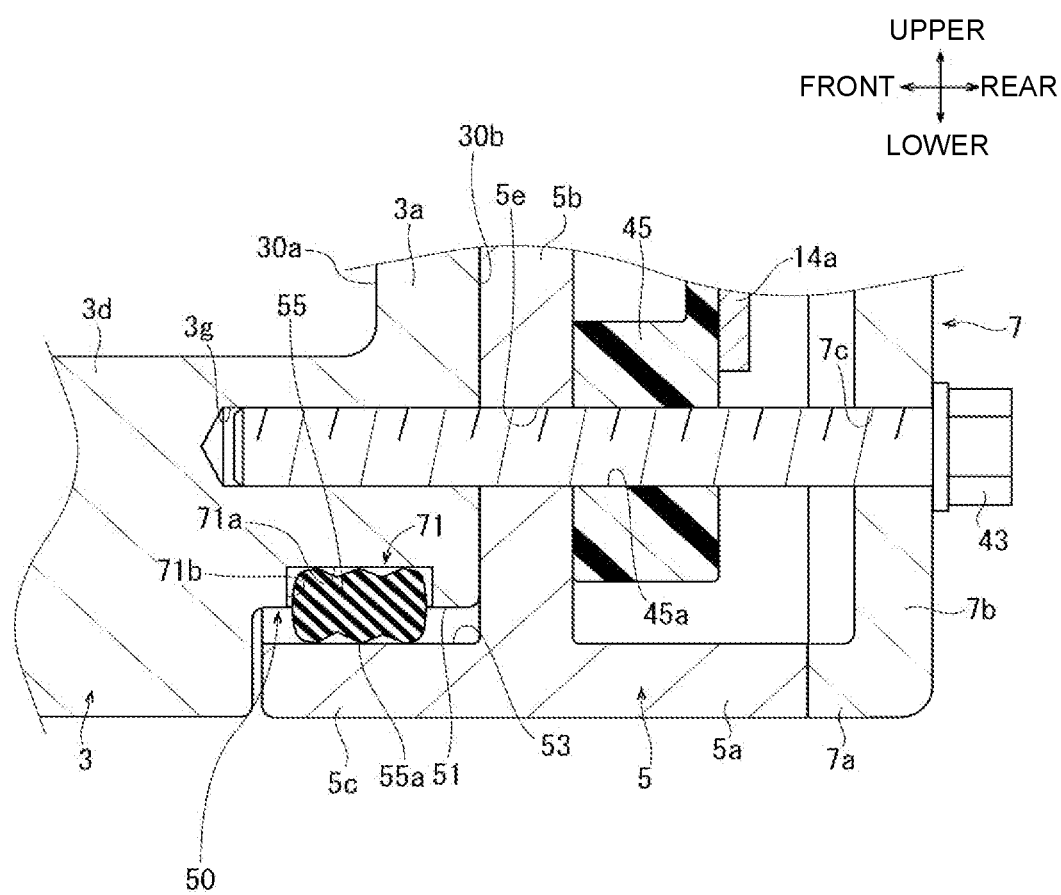
FIG. 2 is an enlarged-sectional view of a main part of the electric compressor according to the first embodiment.

As illustrated in FIG. 2, the motor housing 3 has, at a rear end thereof, an end portion 50 that has a diameter smaller than a diameter of each of other parts of the motor housing 3. The end portion 50 has an outer peripheral surface that serves as a first peripheral surface 51, and the first peripheral surface 51 forms a cylindrical shape and extends in the axial direction of the motor housing 3. The first peripheral surface 51 serves as a peripheral surface of the present disclosure. That is, the end portion 50 includes the motor bottom wall 3a that has the rear surface 30b, and the first peripheral surface 51. The first peripheral surface 51 doubles as an outer peripheral surface of the motor bottom wall 3a. The first peripheral surface 51 is connected to the rear end of the motor peripheral wall 3d, i.e., the rear surface 30b.

The first peripheral surface 51 has an accommodation groove 71. The accommodation groove 71 is formed in the first peripheral surface 51 and is recessed in a direction radially away from the second peripheral wall 5c. The accommodation groove 71 has a circular ring shape and extends over a whole circumference of the first peripheral surface 51 in the circumferential direction. The accommodation groove 71 has a bottom surface 71a and a side surface 71b. The bottom surface 71a is flat, and faces the second peripheral wall 5c in the radial direction. The side surface 71b extends in the radial direction, and is connected to the bottom surface 71a and the first peripheral surface 51. The second peripheral wall 5c has a second peripheral surface 53 that forms a cylindrical shape, and the second peripheral surface 53 extends forward in the axial direction and faces the first peripheral surface 51 and the accommodation groove 71. The first peripheral wall 5a and the second peripheral wall 5c each have a cylindrical shape, and the cylindrical first peripheral wall 5a has a diameter equal to a diameter of the cylindrical second peripheral wall 5c, and is formed coaxially with the second peripheral wall 5c. An outer peripheral surface of the first peripheral wall 5a is continuously connected to the second peripheral wall 5c. The first peripheral wall 5a, the second peripheral wall 5c, the cover peripheral wall 7a, and the motor peripheral wall 3d have the same diameter and are formed coaxially with each other.

The accommodation groove 71, i.e., the end portion 50 (the first peripheral surface 51), cooperates with the second peripheral wall 5c to hold the sealing member 55, which is made of rubber, between the motor housing 3 and the inverter case 4 in a radial direction of the sealing member 55. The radial direction and an axial direction of the sealing member 55 correspond to those of the motor housing 3 (including the peripheral surface of the present disclosure, i.e., the first peripheral surface 51), the inverter case 4 (including the case peripheral wall of the present disclosure, i.e., the first peripheral surface 5a, the second peripheral wall 5c, and the cover peripheral wall 7a), and the rotary shaft 19. The sealing member 55 seals a space in which the lead terminals 49 are disposed. More specifically, the sealing member 55 has a circular ring shape. The sealing member 55 has a plurality of raised portions 55a in a form of a plurality of lines on an inner peripheral surface of the sealing member 55 that faces the accommodation groove 71 and on an outer peripheral surface of the sealing member 55 that faces the second peripheral surface 53. Each of the raised portions 55a has a circular ring shape along the inner peripheral surface and the outer peripheral surface of the sealing member 55. The sealing member 55 is disposed between the accommodation groove 71 and the second peripheral surface 53, i.e., between the first peripheral surface 51 and the second peripheral surface 53, with the sealing member 55 accommodated in the accommodation groove 71. The whole of the sealing member 55 is accommodated in the accommodation groove 71 in the axial direction; however, a part of an outer periphery of the sealing member 55, which includes the outer peripheral surface of the sealing member 55, protrudes from the accommodation groove 71. In other words, the accommodation groove 71 has a depth capable of accommodating an approximately radial half of the sealing member 55. The sealing member 55 in the accommodation groove 71 is held between the bottom surface 71a and the second peripheral wall 5c in the radial direction of the sealing member 55, and a whole outer periphery of the sealing member 55 is covered by the second peripheral wall 5c. Accordingly, the whole of the sealing member 55 is hidden from the outside of the electric compressor by the second peripheral wall 5c. The first peripheral wall 5a surrounds the inverter 14 and the second peripheral wall 5c surrounds the end portion 50.

The inverter cover wall 7b of the inverter cover 7, the inverter holder 45, the inverter bottom wall 5b of the inverter box 5, and the motor peripheral wall 3d have a plurality of bolt holes 7c, a plurality of bolt holes 45a, a plurality of bolt holes 5e, and a plurality of bolt holes 3g, respectively. A plurality of fasteners, which in this embodiment, is a plurality of bolts 43 is inserted through the bolt holes 7c, 45a, 5e and screwed into the bolt holes 3g. That is, the bolts 43 penetrate through the inverter case 4 and are fastened to one end of the motor housing 3.

The electric compressor configured as described above cooperates with the evaporator, the expansion valve, and the condenser to form the refrigeration circuit of an air conditioning device for a vehicle. This electric compressor operates as described below. When a driver of the vehicle activates the air conditioning device, the inverter 14 controls the motor 12 to rotate the rotor 35 and the rotary shaft 19. Accordingly, the eccentric pin 19a orbits around the axis O. The anti-rotation pin 17a slides and rotates along the inner peripheral surface of the ring 17c, thereby restraining the rotation of the movable scroll 15 while allowing the orbiting of the movable scroll 15 around the axis O. The orbiting of the movable scroll 15 moves the compression chamber 31 from the outer periphery side of the fixed scroll 13 and the movable scroll 15 toward the center of the fixed scroll 13 and the movable scroll 15 while decreasing a volume of the compression chamber 31. Accordingly, the refrigerant supplied to the motor chamber 3c from the evaporator through the inlet 3e is introduced into and compressed in the compression chamber 31. The refrigerant compressed to a discharge pressure is discharged into the discharge chamber 37 through the discharge port 13d, and ejected into the condenser through the outlet 1a. Therefore, the air conditioning is performed by the air conditioning device for a vehicle as described above.

In this electric compressor, the ring-shaped sealing member 55 seals a gap between the bottom surface 71a of the accommodation groove 71 and the second peripheral surface 53 of the second peripheral wall 5c of the inverter box 5, i.e., a gap between the end portion 50 and the second peripheral wall 5c.

In this electric compressor, the plurality of bolts 43 fastens the motor housing 3 to the inverter case 4 in an axial direction of the motor housing 3, and the sealing member 55 is disposed between the accommodation groove 71 and the second peripheral wall 5c, i.e., between the first peripheral surface 51 of the end portion 50 and the second peripheral surface 53 of the second peripheral wall 5c. The first peripheral surface 51 in which the accommodation groove 71 is formed forms a cylindrical shape and extends in the axial direction, and the second peripheral surface 53 forms a cylindrical shape and extends in the axial direction. This configuration prevents the sealing member 55 from being axially pressed by a fastening power of the bolts 43. In this electric compressor, the sealing member 55 is accommodated in the accommodation groove 71 that is formed in the end portion 50 of the motor housing 3, more specifically, in the first peripheral surface 51 of the end portion 50. The sealing member 55 contacts the accommodation groove 71, more specifically, the side surface 71b of the accommodation groove 71 if the sealing member 55 moves in the axial direction during the assembly of the motor housing 3 and the inverter box 5 in the axial direction or during the fastening of the inverter case 4 to the motor housing 3 with the bolts 43 in the axial direction of the motor housing 3. This configuration restricts the sealing member 55 from moving out of the accommodation groove 71 in the axial direction. Accordingly, the sealing member 55 is unlikely to displace relative to the first peripheral surface 51 and the second peripheral surface 53 in the axial direction, and seals the gap between the end portion 50 and the second peripheral wall 5c at an appropriate position.

Furthermore, in this electric compressor, the first peripheral wall 5a and the second peripheral wall 5c extend from the inverter bottom wall 5b in opposite directions, and this configuration allows the inverter case 4 to have sufficient rigidity to resist a high fastening force.

Particularly, in this electric compressor, the first peripheral wall 5a and the second peripheral wall 5c each have a cylindrical shape and have an equal diameter to form one continuous peripheral wall, so that the inverter case 4 easily exhibits the required strength even if a wall thickness of the inverter case 4 is reduced for weight reduction. Accordingly, the inverter case 4 exhibits excellent durability.

The sealing member 55 has the ring-shaped raised portions 55a in a form of a plurality of lines on each of the outer peripheral surface and the inner peripheral surface of the sealing member 55, so that the sealing member 55 contacts the bottom surface 71a of the accommodation groove 71 and the second peripheral surface 53 of the second peripheral wall 5c at the plurality of lines. This configuration prevents moisture from entering from outside the compressor at the raised portion 55a as the second-outermost line on the outer peripheral surface of the sealing member 55 and/or the raised portion 55a as the second-outermost line on the inner peripheral surface of the sealing member 55 even if the moisture from the outside has crossed the raised portion 55a as the outermost line on the outer peripheral surface on the sealing member 55 and/or the raised portion 55a as the outermost line on the inner peripheral surface of the sealing member 55, so that the sealing member 55 exhibits a higher sealing effect. Accordingly, the sealing member 55 exhibits excellent durability and a preferred sealing effect.

Therefore, in this electric compressor, the lead terminals 49 are unlikely to contact moisture outside the compressor even in a state where the electric compressor is in use in a moisture and salty environment, and the deterioration of the lead terminals 49 and a short circuit are therefore surely reduced. The sealing member 55 does not contact the bottom surface 71a and the second peripheral surface 53, except at the raised portions 55a. That is, the sealing member 55 only makes point contact with the bottom surface 71a and the second peripheral surface 53 at the raised portions 55a. This reduces an area of contact between the sealing member 55 and the bottom surface 71a and an area of contact between the sealing member 55 and the second peripheral surface 53. However, as described above, the accommodation groove 71 of this electric compressor restricts the movement of the sealing member 55 in the axial direction. Accordingly, the sealing member 55 is not easily deformed by the movement of the sealing member 55 in the axial direction although the area of contact between the sealing member 55 and the bottom surface 71a and the area of contact between the sealing member 55 and the second peripheral surface 53 are reduced. This electric compressor surely prevents a possibility that one or some of the raised portions 55a leave or do not fully contact the bottom surface 71a or the second peripheral surface 53 during the assembly of the motor housing 3 and the inverter box 5 in the axial direction or during the fastening of the inverter case 4 to the motor housing 3 with the bolts 43 in the axial direction of the motor housing 3.

Therefore, even under severe conditions, this electric compressor has higher durability and surely reduces a deterioration of the lead terminals 49 and a short circuit.

In this electric compressor, the first peripheral surface 51 and the second peripheral surface 53 each form a cylindrical shape, and the sealing member 55 and the accommodation groove 71 each have a circular ring shape. Accordingly, when the axial direction of the electric compressor is set horizontally, the moisture, which may have reached the first peripheral surface 51 or the second peripheral surface 53 from outside the compressor, is easy to drain outside the sealing member 55 under moisture's own weight without entering inside the sealing member 55. Therefore, the compressor reduces the deterioration of the sealing member 55, the motor housing 3, and the inverter case 4, thereby exhibiting higher durability.

Furthermore, in the electric compressor, the inverter case 4 is fastened to the motor housing 3, so that the second peripheral wall 5c covers the whole of the accommodation groove 71 from the outer side of the compressor. Accordingly, the second peripheral wall 5c also covers the whole of the sealing member 55 in the accommodation groove 71 from the outer side of the compressor. Therefore, in this electric compressor, the sealing member 55 is unlikely to be deteriorated by ultraviolet, thereby exhibiting higher durability. The second peripheral wall 5c covers the whole of the accommodation groove 71 and the sealing member 55 in such a manner, so that moisture is unlikely to reach the sealing member 55 from outside the electric compressor. Particularly, the sealing member 55 contacts the bottom surface 71a and the second peripheral surface 53 at the plurality of lines of the sealing member 55, so that the second-outermost line prevents moisture from entering the compressor even if the moisture from the outside has crossed the outermost line. Accordingly, the sealing member 55 exhibits a higher sealing effect.

In this electric compressor, the motor housing 3 has the motor chamber 3c that doubles as the suction chamber, and the rear surface 30b of the motor bottom wall 3a of the motor housing 3 contacts the inverter bottom wall 5b. This configuration facilitates the cooling of the inverter 14. The switching element 14b and the coil 14c may contact the inverter bottom wall 5b if the cooling of the switching element 14b and the coil 14c is desired especially.

In this electric compressor, the inverter case 4 serves as an individual container that is formed separately from the motor housing 3, in contrast to an electric compressor in which a cup-shaped member is joined to an end face of the motor housing 3 to form an inverter accommodation chamber. This configuration makes it easy to increase the size of a space for accommodating the inverter 14 as the inverter 14 including a filter element increases in size. This increases the weight of the inverter case 4 and the inverter 14 and requires a high tightening force of the fasteners, but does not deteriorate the sealing member 55.

Second Embodiment

Figure 3:
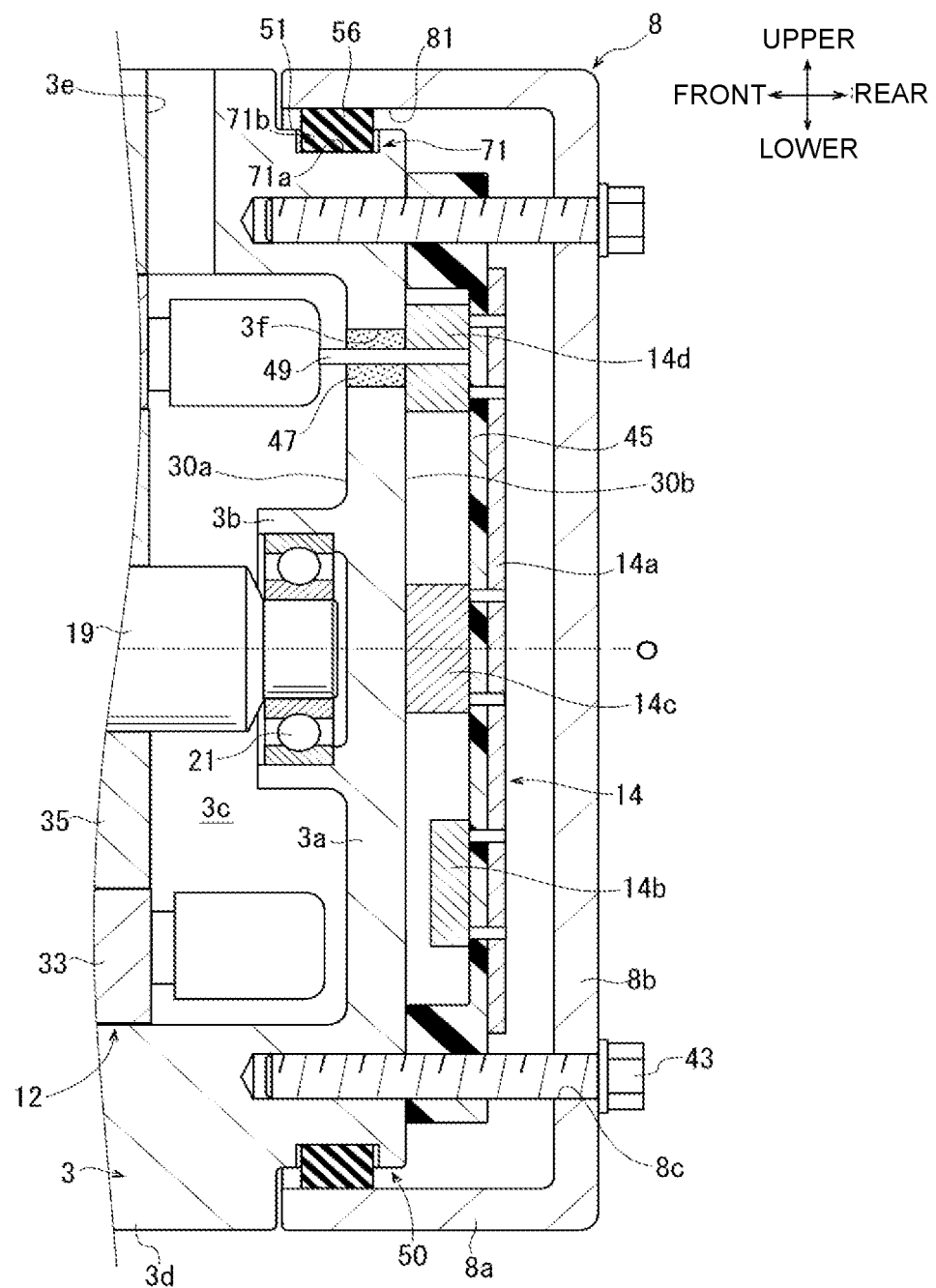
FIG. 3 is an enlarged-sectional view of a main part of an electric compressor according to a second embodiment.

As illustrated in FIG. 3, an electric compressor according to a second embodiment includes an inverter case 8 and a sealing member 56 instead of the inverter case 4 and the sealing member 55 of the electric compressor according to the first embodiment. In the electric compressor according to the first embodiment, the inverter case 4 is formed of two members such as the inverter box 5 and the inverter cover 7m. In contrast, in the electric compressor according to the second embodiment, the inverter case 8 is formed of a single member.

The inverter case 8 includes a case peripheral wall 8a and a case bottom wall 8b. The case peripheral wall 8a has a cylindrical shape and extends in the axial direction. More specifically, the cylindrical case peripheral wall 8a has a diameter that is equal to a diameter of the motor peripheral wall 3d of the motor housing 3 and is coaxial with the motor peripheral wall 3d. That is, the diameter of the case peripheral wall 8a is larger than a diameter of the end portion 50 of the motor housing 3. The case peripheral wall 8a has a third peripheral surface 81 that faces the first peripheral surface 51 of the end portion 50 and the accommodation groove 71.

The case bottom wall 8b has a disk shape. The case bottom wall 8b is connected to the case peripheral wall 8a and extends inwardly from the case peripheral wall 8a in a radial direction of the case peripheral wall 8a. The case bottom wall 8b has a plurality of bolt holes 8c. The inverter case 8 does not include the inverter bottom wall 5b. Accordingly, the inverter case 8 has a bottomed-cylindrical shape, that is, a cup shape by using the case peripheral wall 8a and the case bottom wall 8b.

In this electric compressor, the inverter case 8 accommodates the inverter 14 and the inverter holder 45, and is joined to the end portion 50 of the motor housing 3 with the plurality of bolts 43. Accordingly, the case peripheral wall 8a of the inverter case 8 surrounds the end portion 50 while surrounding the inverter 14 and the inverter holder 45. The case bottom wall 8b faces the board 14a of the inverter 14 in the front-to-rear direction. Since the inverter case 8 does not include the inverter bottom wall 5b, the inverter holder 45 is held by the rear surface 30b of the motor bottom wall 3a of the motor housing 3.

The sealing member 56 is made of rubber and has a circular ring shape similar to the sealing member 55. However, the sealing member 56 does not include the raised portions 55a in contrast to the sealing member 55. The sealing member 56 has a rectangular shape in a radial-sectional view of the sealing member 56. More specifically, in a radial-sectional view of the sealing member 56, the sealing member 56 has a rectangular shape wherein edges of the sealing member 56 in the axial direction are longer than edges of the sealing member 56 in the radial direction.

The sealing member 56 is disposed between the bottom surface 71a of the accommodation groove 71 and the third peripheral surface 81, i.e., between the first peripheral surface 51 and the third peripheral surface 81, with the sealing member 56 accommodated in the accommodation groove 71. The whole of the sealing member 56 is accommodated in the accommodation groove 71 in the axial direction; however, a part of an outer periphery of the sealing member 56, which includes an outer peripheral surface of the sealing member 56, protrudes from the accommodation groove 71. The sealing member 56 in the accommodation groove 71 is held by the bottom surface 71a and the case peripheral wall 8a in a radial direction of the sealing member 56, thereby sealing a space in which the lead terminals 49 are disposed. The radial direction and an axial direction of the sealing member 56 correspond to those of the motor housing 3 (including the peripheral surface of the present disclosure, i.e., the first peripheral surface 51), the inverter case 8 (including the case peripheral wall of the present disclosure, i.e., the case peripheral wall 8a), and the rotary shaft 19. A whole outer periphery of the sealing member 56 is covered by the case peripheral wall 8a. Accordingly, a whole of the sealing member 56 is hidden from the outside of the electric compressor by the case peripheral wall 8a. Other configurations of the electric compressor of this embodiment are the same as those of the electric compressor of the first embodiment with the same reference characters denoting the same components, and the detailed description thereof is not repeated.

In this electric compressor, the sealing member 56 has a rectangular shape in the radial-sectional view of the sealing member 56, so that the outer peripheral surface and the inner peripheral surface of the sealing member 56 respectively make a surface contact with the third peripheral surface 81 and the bottom surface 71a. This configuration secures a large area of contact between the sealing member 56 and the third peripheral surface 81 and a large area of contact between the sealing member 56 and the bottom surface 71a. Particularly, in the radial-sectional view of the sealing member 56, the sealing member 56 has a rectangular shape, and the edges of the sealing member 56 in the axial direction are longer than the edges of the sealing member 56 in the radial direction. Accordingly, this electric compressor has a large area of contact between the sealing member 56 and the third peripheral surface 81 and a large area of contact between the sealing member 56 and the bottom surface 71a, compared with a case where the sealing member 56 has a square shape in the radial-sectional view of the sealing member 56. Therefore, in this electric compressor, the sealing member 56 suitably seals a gap between the bottom surface 71a and the third peripheral surface 81, i.e., a gap between the end portion 50 and the case peripheral wall 8a. The sealing member 56 does not need the raised portions 55a unlike the sealing member 55, so that the sealing member 56 has a simple configuration compared with the sealing member 55. Therefore, in this electric compressor, the sealing member 56 is easy to form.

In this electric compressor, the inverter case 8 is formed of a single member, and the inverter case 8 includes a case peripheral wall 8a and a case bottom wall 8b to have a bottomed-cylindrical shape. This configuration allows the electric compressor of this embodiment to have a reduced number of parts, thereby reducing the manufacturing cost, in comparison with the electric compressor of the first embodiment. Other advantageous effects of the electric compressor of this embodiment are the same as those of the electric compressor of the first embodiment.

Reference Embodiment

Figure 4:
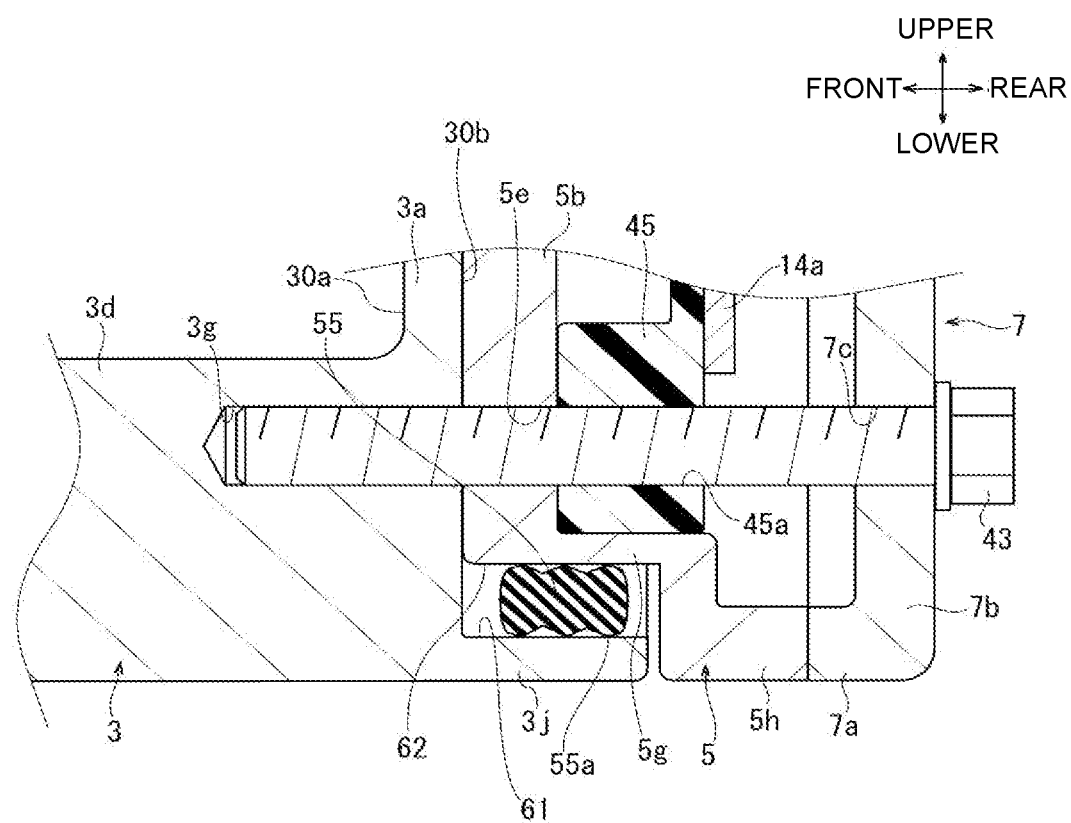
FIG. 4 is an enlarged-sectional view of a main part of an electric compressor according to a reference embodiment.

In an electric compressor according to a reference embodiment, as illustrated in FIG. 4, the motor housing 3 includes a cylindrical portion 3j having a cylindrical shape at a rear end of the motor bottom wall 3a, and the cylindrical portion 3j has an inner peripheral surface that serves as a first peripheral surface 61. The first peripheral surface 61 forms a cylindrical shape and extends rearward in the axial direction. The cylindrical portion 3j is connected to the motor peripheral wall 3d. The inverter box 5 includes a first peripheral wall 5g and a first peripheral wall 5h that is continuously connected to the first peripheral wall 5g, and does not include the second peripheral wall 5c of the first embodiment. A diameter of the first peripheral wall 5g is smaller than a diameter of the first peripheral wall 5h. The first peripheral wall 5g has an outer peripheral surface that serves as a second peripheral surface 62. The second peripheral surface 62 faces the first peripheral surface 61. The sealing member 55 is disposed between the first peripheral surface 61 and the second peripheral surface 62. In this electric compressor, the accommodation groove 71 for accommodating the sealing member 55 is not formed in the first peripheral surface 61 or the second peripheral surface 62. Other configurations of the electric compressor of this embodiment are the same as those of the electric compressor of the first embodiment.

This electric compressor may have a concern about strength since the inverter box 5 does not include the second peripheral wall 5c. Additionally, in this electric compressor, the cylindrical portion 3j needs to be formed in the motor housing 3. This complicates the manufacturing of the motor housing 3, thereby increasing the manufacturing cost of the electric compressor. Furthermore, since the accommodation groove 71 is not formed in the first peripheral surface 61 or the second peripheral surface 62 in this electric compressor, the sealing member 55 is likely to move in the axial direction during the assembly of the motor housing 3 and the inverter box 5 in the axial direction or during the fastening of the inverter case 4 to the motor housing 3 with the bolts 43 in the axial direction of the motor housing 3. Accordingly, it is difficult for the sealing member 55 to seal the gap between the first peripheral surface 61 and the second peripheral surface 62 at a suitable position.

Although the present disclosure has been described based on the above embodiments, the present disclosure is not limited to the above embodiments, and may be modified within the scope of the present disclosure.

For example, the electric compressor of the first embodiment and the second embodiment uses the scroll-type compression part 10, but the electric compressor of the present disclosure may use other types of compression part, such as a swash scroll type, a vane type, or the like.

The configuration of the first embodiment and the configuration of the second embodiment may be combined to form the electric compressor.

The present disclosure is applicable to an air conditioning device for a vehicle or the like.

What is claimed is:

1. An electric compressor comprising:
a compression part configured to compress fluid;
a motor configured to drive the compression part;
an inverter configured to control the motor;
a motor housing having a bottomed-cylindrical shape and accommodating the motor;
an inverter case joined to an end portion of the motor housing and accommodating the inverter;
a fastener for fastening the inverter case to the motor housing in an axial direction of the motor housing; and
a conductive member through which the inverter is electrically connected to the motor, wherein
the inverter case includes a case peripheral wall that has a cylindrical shape and surrounds the inverter and the end portion of the motor housing,
the end portion of the motor housing has an end face that extends in a radial direction of the motor housing and a peripheral surface that extends in the axial direction of the motor housing and is connected to the end face, wherein the conductive member is disposed on the end face, and the fastener is a bolt screwed into the end face of the end portion,
a sealing member has a ring shape and is disposed between the peripheral surface and the case peripheral wall,
an accommodation groove for accommodating the sealing member is recessed in the peripheral surface, and
the sealing member is held by the peripheral surface and the case peripheral wall in a radial direction of the sealing member to seal a space in which the conductive member is disposed, wherein
the inverter case includes an inverter bottom wall that extends in the radial direction of the motor housing, is connected to the case peripheral wall, and faces the end face in the axial direction,
the case peripheral wall includes a first peripheral wall that surrounds the inverter and a second peripheral wall that surrounds the end portion and cooperates with the peripheral surface to hold the sealing member, and
the second peripheral wall is located opposite to the first peripheral wall in the axial direction with the inverter bottom wall disposed between the first peripheral wall and the second peripheral wall,
wherein the bolt fastens the motor housing to the inverter case in the axial direction, and the bolt generates a fastening power and the second peripheral wall restricts the sealing member accommodated in the accommodation groove in the axial direction.

2. The electric compressor according to claim 1, wherein the sealing member has a plurality of raised portions in a form of a plurality of lines on each of an outer peripheral surface of the sealing member and an inner peripheral surface of the sealing member, and the raised portions each have a ring shape.

3. The electric compressor according to claim 1, wherein the sealing member has a rectangular shape in a radial-sectional view of the sealing member.

4. The electric compressor according to claim 1, wherein the case peripheral wall covers a whole of the accommodation groove.

5. The electric compressor according to claim 1, wherein the peripheral surface and the second peripheral wall each have a cylindrical shape, and the sealing member and the accommodation groove each have a circular ring shape.

6. The electric compressor according to claim 5, wherein the first peripheral wall has a cylindrical shape wherein the first peripheral wall has a diameter equal to a diameter of the cylindrical second peripheral wall and is coaxial with the second peripheral wall.

7. The electric compressor according to claim 1, wherein the accommodation groove for accommodating the sealing member includes (i) a side surface extending radially inward from the peripheral surface and which defines a side of the accommodation groove, and (ii) a bottom surface extending from the side surface in the axial direction and which defines a bottom of the accommodation groove.

* * * * *